United States Patent [19]
Matsuda

[11] Patent Number: 5,523,538
[45] Date of Patent: Jun. 4, 1996

[54] WIRE GUIDE APPARATUS FOR AN ELECTRIC SPARK FORMING MACHINE

[75] Inventor: Isamu Matsuda, Haibara-gun, Japan

[73] Assignee: Yazaki Corporation, Tokyo, Japan

[21] Appl. No.: 248,243

[22] Filed: May 24, 1994

[30] Foreign Application Priority Data

Jun. 15, 1993 [JP] Japan .................. 5-143654

[51] Int. Cl.⁶ .................................. B23H 7/10
[52] U.S. Cl. .................................. 219/69.12
[58] Field of Search ........................ 219/69.12

[56] References Cited

U.S. PATENT DOCUMENTS

| | | | |
|---|---|---|---|
| 3,822,374 | 7/1974 | Ullmann et al. | 219/69.12 |
| 4,242,558 | 12/1980 | Kunze | 219/69.12 |
| 5,045,662 | 9/1991 | Yamada | 219/69.12 |
| 5,357,072 | 10/1994 | Garwick | 219/69.12 |

FOREIGN PATENT DOCUMENTS

| | | | |
|---|---|---|---|
| 3631888C2 | 10/1988 | Germany. | |
| 4005732A1 | 8/1990 | Germany. | |
| 4120739 | 12/1992 | Germany | 219/69.12 |
| 4418603.7 | 11/1995 | Germany. | |
| 59-205230 | 11/1984 | Japan. | |
| 63-120033 | 5/1988 | Japan | 219/69.12 |
| 63-312025 | 12/1988 | Japan | 219/69.12 |
| 2-59221 | 2/1990 | Japan | 219/69.12 |
| 2-48122 | 2/1990 | Japan | 219/69.12 |
| 2-38141 | 3/1990 | Japan. | |
| 3-35942 | 2/1991 | Japan | 219/69.12 |

*Primary Examiner*—Geoffrey S. Evans
*Attorney, Agent, or Firm*—Armstrong, Westerman, Hattori, McLeland & Naughton

[57] ABSTRACT

A wire guide apparatus for the wire electrode electric spark forming machine utilizes the flow of compressed air for feeding the used wire into a cutting apparatus that is operated in combination with the wire guide apparatus. The wire guide apparatus includes a guide tube 1 for taking in the used wire from the electric spark forming machine and a compressed air supply section 2. The guide tube 1 has a funnel-shaped wire introducing port 3 formed at the upper end and a wire discharge port at the lower end. The compressed air is injected into the guide tube 1 from the fluid injection path 5 formed in the circumferential wall 1a of the guide tube to smoothly guide the wire 12 from the wire introducing port 3 to the outside of the wire discharge port 4.

7 Claims, 6 Drawing Sheets

WIRE GUIDE APPARATUS FOR AN ELECTRIC SPARK FORMING MACHINE

BACKGROUND OF THE INVENTION

FIELD OF THE INVENTION

The present invention relates to a wire guide apparatus to smoothly guide the delivery of a wire used in a wire electrode electric spark forming machine and also a wire guide apparatus whereof a wire cutting apparatus is installed in the following process.

DESCRIPTION OF THE PRIOR ART

A conventional wire electrode electric spark forming machine used for manufacturing plastics molding dies, for example, makes holes of specified shape in the dies by continuously feeding a wire as an electrode by a supply reel and a takeup reel, generating sparks between the wire and the dies fixed on the work table, and moving the work table with high precision at the same time.

The wire used as an electrode is normally 0.1 to 0.3 mm in diameter and about 5 kg of wire wound on the supply reel is continuously fed out at the rate of 80–250 mm/second.

In wire electrode electric spark forming machines in recent years, because the used wire fed out from the discharge roller cannot be reused as is, it is considered advantageous to feed the used wire directly from the discharge roller indiscriminately into a wire receiving container rather than winding it on the takeup reel and to melt it down in a mass for reuse. Generally, a wire electrode electric spark forming machine with an automatic wire connection function necessarily adopts the above-mentioned indiscriminately-receiving method.

In the indiscriminately-receiving method, when the used wire is continuously fed into the wire receiving container, the wire, when piled up high, has an apparent specific gravity of approximately one-thirty of the wire and occupies a very large space, overflowing the container in a short time. Hence, as the wire piles up, it may twist around the discharge roller of the wire electrode electric spark forming machine.

Therefore, a worker needs to watch the flow of the used wire frequently during operation, and the procedure to rectify the entanglement of the wire is complex and prevents automation of operation. It has therefore been conceived to cut the used wire into small pieces, as indicated in the Japanese Utility Model Preliminary Publication No. Heisei 2-38141, which proposes a wire cutting apparatus K for electric spark forming as shown in FIG. 7 herein.

The wire cutting apparatus K for electric spark forming is installed at the end of the wire electrode electric spark forming machine and outs the wire c paid out from the wire electrode electric spark forming machine into chips 6 cm long by a rotary blade a mounted on a rotating shaft driven by a geared motor and a stationary blade b arranged facing the rotary blade a, with the cut wire chips accommodated in a separate container.

That is, the used wire c fed out from the wire electrode electric spark forming machine is guided along a guide tube d and gripped by feed rollers e. The wire c gripped by the feed rollers e is fed down the side surface of the stationary blade b and at the same time clamped and out by the rotary blade a and the stationary blade into chips. The wine chips c fall along a guide plate f into a separate container.

With the wire cutting apparatus K for electric spark forming described above, however, because there is friction resistance due to contact between the used wire c fed out from the wire electrode electric spark forming machine and the inner surface of the guide tube d, the wire c may get stuck inside the guide tube d bringing the operation to a halt when the guide tube d is elongated. This makes it necessary to directly install the wire cutting apparatus K at a location very close to the wire discharge port of the electric spark forming machine. For this reason, impacts produced by the operation of the cutting blade are transmitted to the electric spark forming machine degrading the machining precision. Further, since the wire cutting is done by a single rotary blade a mounted on the rotating shaft and the wire is cut once for each rotation of the shaft producing cut chips as long as 6 cm each, the wire volume after discharge is not reduced significantly, producing little improvement in workability during processing.

SUMMARY OF THE INVENTION

This invention has been accomplished to overcome the above-mentioned drawbacks and its objective is to provide a wire guide apparatus for an electric spark forming machine which smoothly guides the wire fed out from the wire electrode electric spark forming machine by utilizing the flow of compressed gas. Another object is to provide a wire guide apparatus wherein a wire cutting apparatus is installed for operation subsequently in the concerned process.

To achieve the above objective, the wire guide apparatus of this invention comprises:

a guide tube for drawing in a wire; and a compressed gas supply section;

the guide tube including:
  a funnel-shaped wire introducing port formed at one end thereof;
  a wire discharge port formed at the other end thereof;
  a fluid injection path passing through a circumferential wall of the guide tube and opening inside the guide tube toward the wire discharge port;

wherein the wire introducing port of the guide tube is located at a wire discharge section of the electric spark forming machine, and the compressed gas is injected into the guide tube from the compressed gas supply section through the fluid injection path so as to guide the wire from the wire introducing port to the outside of the wire discharge port.

It is preferred that the circumferential wall of the guide tube at the end containing the wire introducing port is formed in substantial conformity with the shape of the nip between the wire discharge rollers so that the tube adjacent the wire introducing port is pointed in a direction toward the end thereof.

It is advantageous if the wire discharge port of the guide tube is connected with a flexible tube, through which the wire is discharged.

Further, the compressed gas is advantageously composed of air, wherein the compressed gas pressure being normally set at 1.0 to 2.0 kg/cm$^2$ at a pressure reducing valve.

And, a wire cutting apparatus can be also preferably installed downstream of the wire guide apparatus for an electric spark forming machine of this invention, wherein the chip length delivered by the wire cutting apparatus being set at around 2 to 5 mm.

Because the wire guide apparatus for an electric spark forming machine according to this invention employs a guide tube that utilizes the flow of compressed gas, the used wire discharged from the electric spark forming machine can reliably be drawn into the guide tube toward the wire discharge port. That is, a compressed gas is blown into the guide tube from the fluid injection path, causing the gas in the guide tube to rapidly flow toward the wire discharge port, so that a negative pressure is created in a space extending from the opening of the fluid injection path to the wire introducing port, drawing the air around the wire introducing port into the guide tube.

Since the wire introducing port of the guide tube is located close to the wire discharge section of the electric spark forming machine, the wire fed out from the electric spark forming machine is drawn into the guide tube together with the gas around the wire introducing port. In the guide tube, the flow of compressed gas mostly eliminates the friction resistance between the inner wall of the guide tube and the wire, so that the wire does not get stuck in the guide tube and is fed smoothly along the discharge port.

This makes it possible to connect a flexible tube to the wire discharge port to virtually elongate the guide tube, which in turn permits the wire to be guided from the wire discharge section of the electric spark forming machine to a remote wire accommodating section.

Further, by pointing the wire introducing port by forming the circumferential wall of the guide tube, it is possible to bring the opening end of the wire introducing port extremely close to the nip of the rollers of the wire discharge section of the electric spark forming machine, permitting an efficient suction of wire.

Moreover, by arranging the wire discharge port of the guide tube or the flexible tube connected to the wire discharge port close to the cutting blade of the wire cutting apparatus, it is possible to cut and process the used wire immediately after it is discharged from the wire guide apparatus.

And, the use of the transparent flexible tube allows quick and reliable check of the wire being guided.

DETAILED DESCRIPTION OF PREFERRED EMBODIMENT

Figure 1:
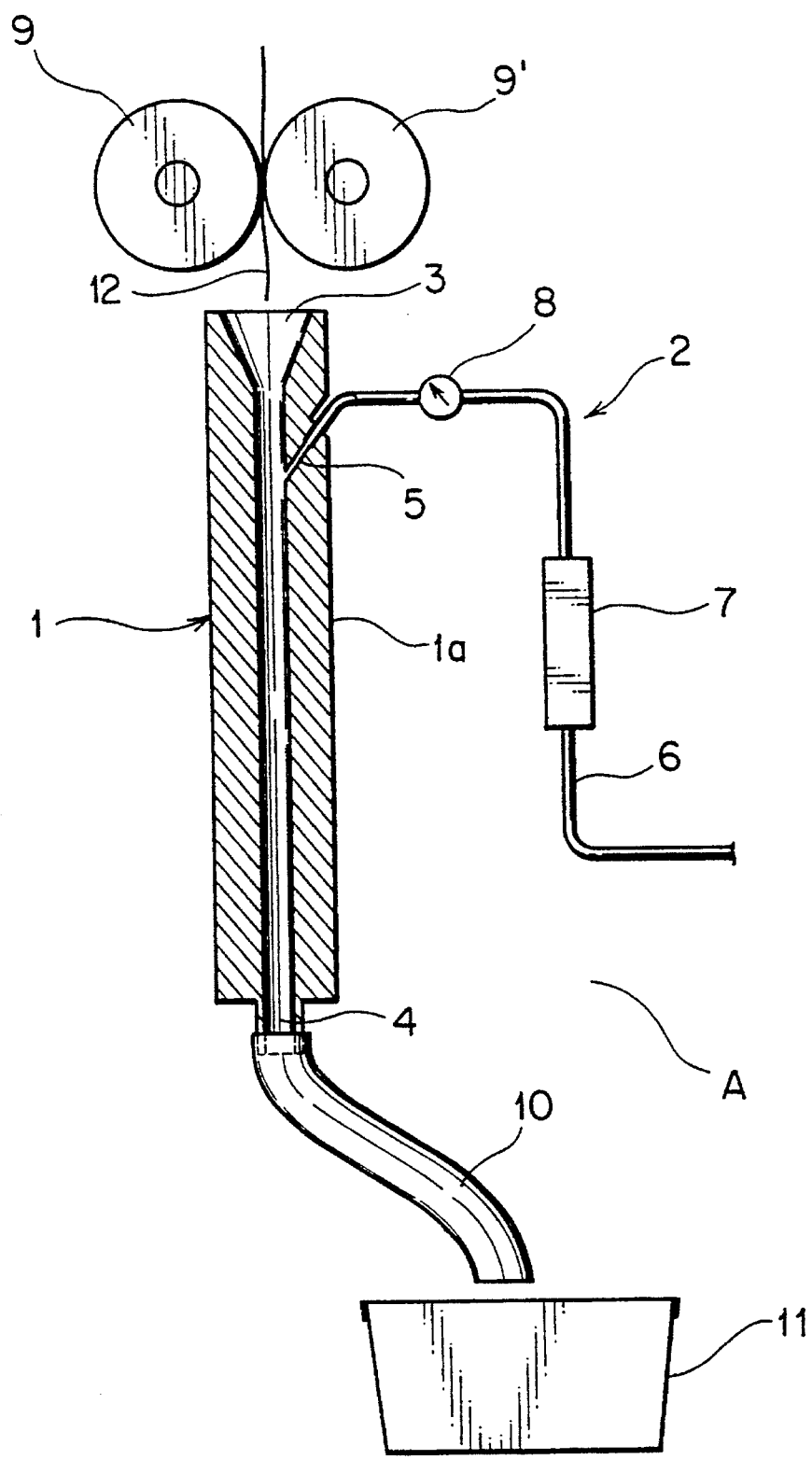
FIG. 1 is a side view of the wire guide apparatus for an electric spark forming machine shown as one embodiment of this invention.

FIG. 1 shows a side view of a wine guide apparatus A for an electric spark forming machine as one embodiment of this invention.

The wire guide apparatus A comprises a guide tube 1 and a compressed gas supply section 2.

The guide tube 1 is formed of a stainless steel tube body, which has a funnel-shaped wire introducing port 3 at the upper end and a wire discharge port 4 at the lower end. Near the wire introducing port 3, a circumferential wall 1a is formed with a fluid injection path 5, which passes through the circumferential wall 1a in a direction inclined toward the wire discharge port 4 and opens inside the guide tube 1.

The compressed gas supply section 2 delivers compressed air, which is supplied from a compressor through an air supply pipe 6, to the fluid injection path in the guide tube 1 through an air filter 7 and a pressure reducing valve 8.

The air filter 7 is designed to remove foreign substances contained in the compressed air supplied through the air supply pipe 6, thereby protecting the whole equipment from failing due to foreign matter clogging the wire guide path.

The pressure reducing valve 8 adjusts the air pressure injected from the fluid injection path 5 according to the distance that the wire 12 is guided. Normally, the air pressure is preferably set at 1.0 to 2.0 kg/cm$^2$.

To guide the used wire discharged from the electric spark forming machine, the wire introducing port 3 of the guide tube 1 is located close to the nip of the wire discharging rollers 9, 9' of the electric spark forming machine, and a wire accommodating box 11 is installed at the end of a flexible transparent plastic tube 10 connected to the wire discharge port 4 of the guide tube 1.

When the compressed air is injected into the guide tube 1 through the pressure reducing valve 8, the flow of compressed air blowing from the fluid injection path 5 toward the wire discharge port 4 creates a negative pressure in the wire introducing port 3, thus drawing the wire 12 discharged by the nip of the rotating rollers 9, 9' from the wire introducing port 3 into the guide tube 1.

The wire 12 drawn into the guide tube 1 is fed through the flexible tube 10 connected to the wire discharge port 4 and is then received into the wire accommodating box 11. The flexible tube 10 may be formed of rubber, synthetic resin, and metal. Of these materials, a synthetic resin is preferred because it allows one to see the interior and easily check the condition of wire 12 being guided. Instead of connecting the flexible tube 10 to the wire discharge port 4, it is also possible to receive the wire directly into the wire accommodating box 11.

Figure 2:
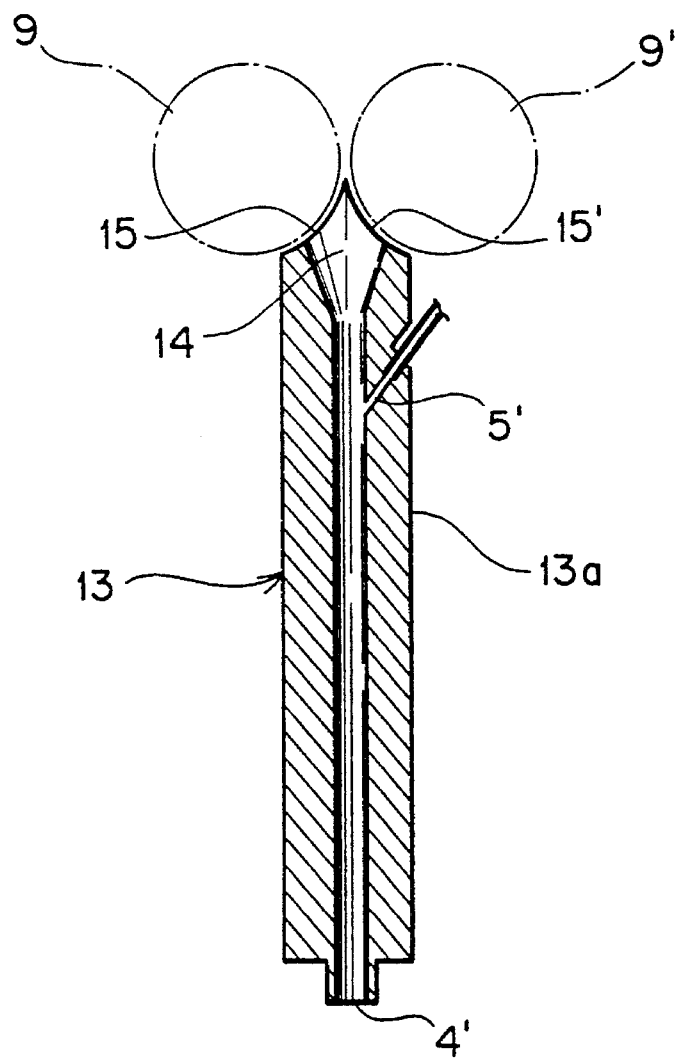
FIG. 2 is a longitudinal cross section of another guide tube used in the wire guide apparatus of FIG. 1.
Figure 3:
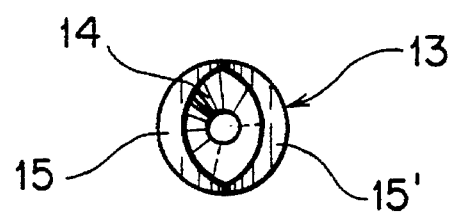
FIG. 3 is a plan view of the guide tube of FIG. 2.

FIG. 2 is a longitudinal cross section of the guide tube 13 associated with another embodiment of this invention. FIG. 3 is a plan view of the guide tube 13.

The guide tube 13, like the aforementioned guide tube 1, is formed of a metallic tube and has a funnel-shaped wire introducing port 14 at the upper end and a wire discharge port 4' at the lower end and also a fluid injection path 5' formed in the circumferential wall 13a.

The funnel-shaped wire introducing port 14 of the guide tube 13 is pointed by cutting the circumferential wall 13a to form on the left and right side of the central axis of the guide tube 13 recessed cylindrical surfaces 15, 15' whose contour conforms to the outer diameter of the nip of the wire discharge rollers 9, 9' of the electric spark forming machine installed facing the guide tube.

By providing the wire introducing port with the arcuate surfaces 15, 15', it is possible to bring the pointed part of the wire introducing port 14 very close to the wire gripping point of the nip of the wire discharge rollers 9, 9'. This makes the suction of wire reliable.

While the above embodiments have been explained in the case where they are used for the guiding of used wire, it should be noted that the wire guide apparatus of this invention is not limited to the guiding of used wire but can also be used for wire guiding in the wire supply process before the spark process.

Figure 4:
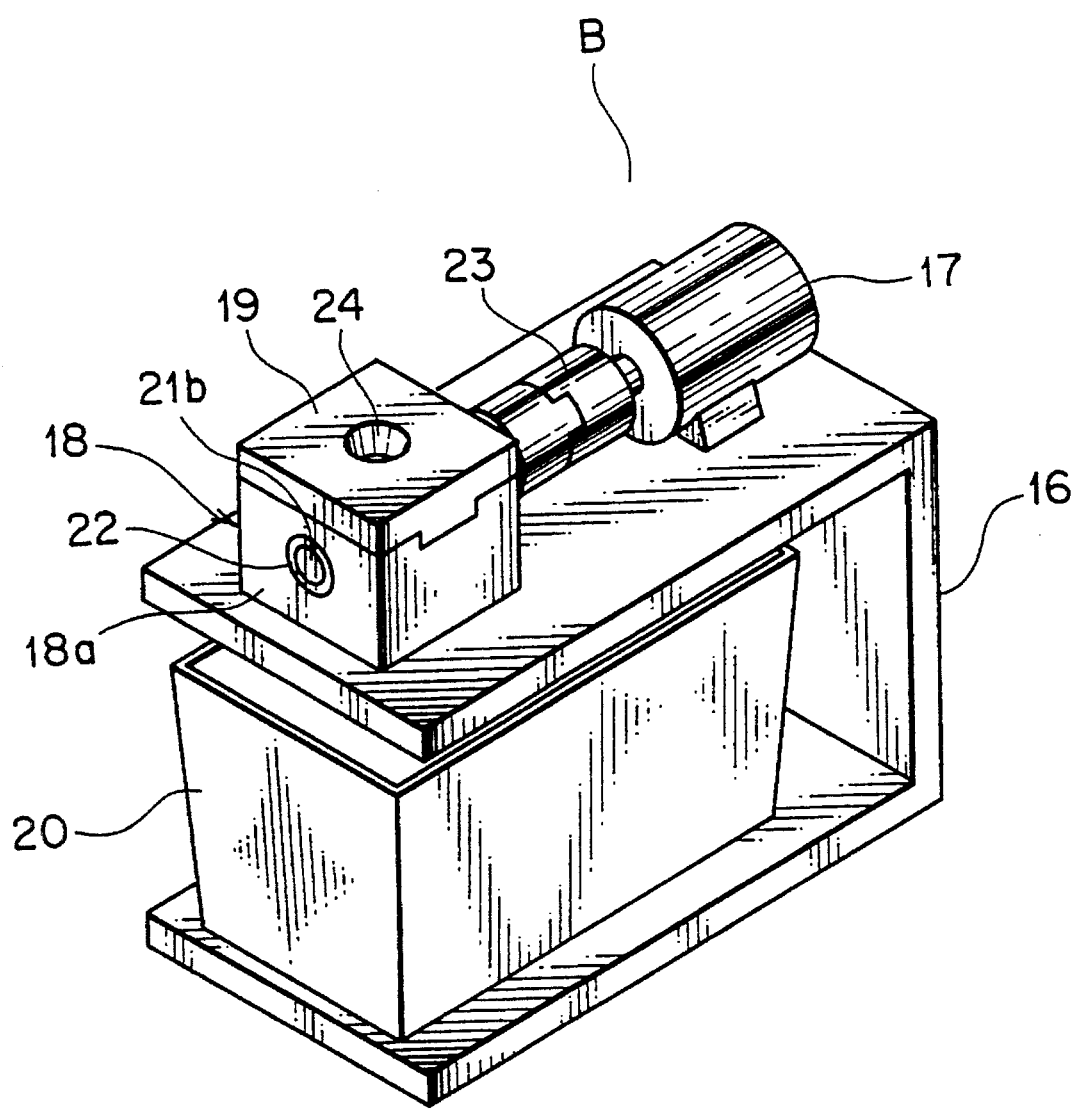
FIG. 4 is a perspective view of the wire cutting apparatus associated with the embodiment of this invention.
Figure 5:
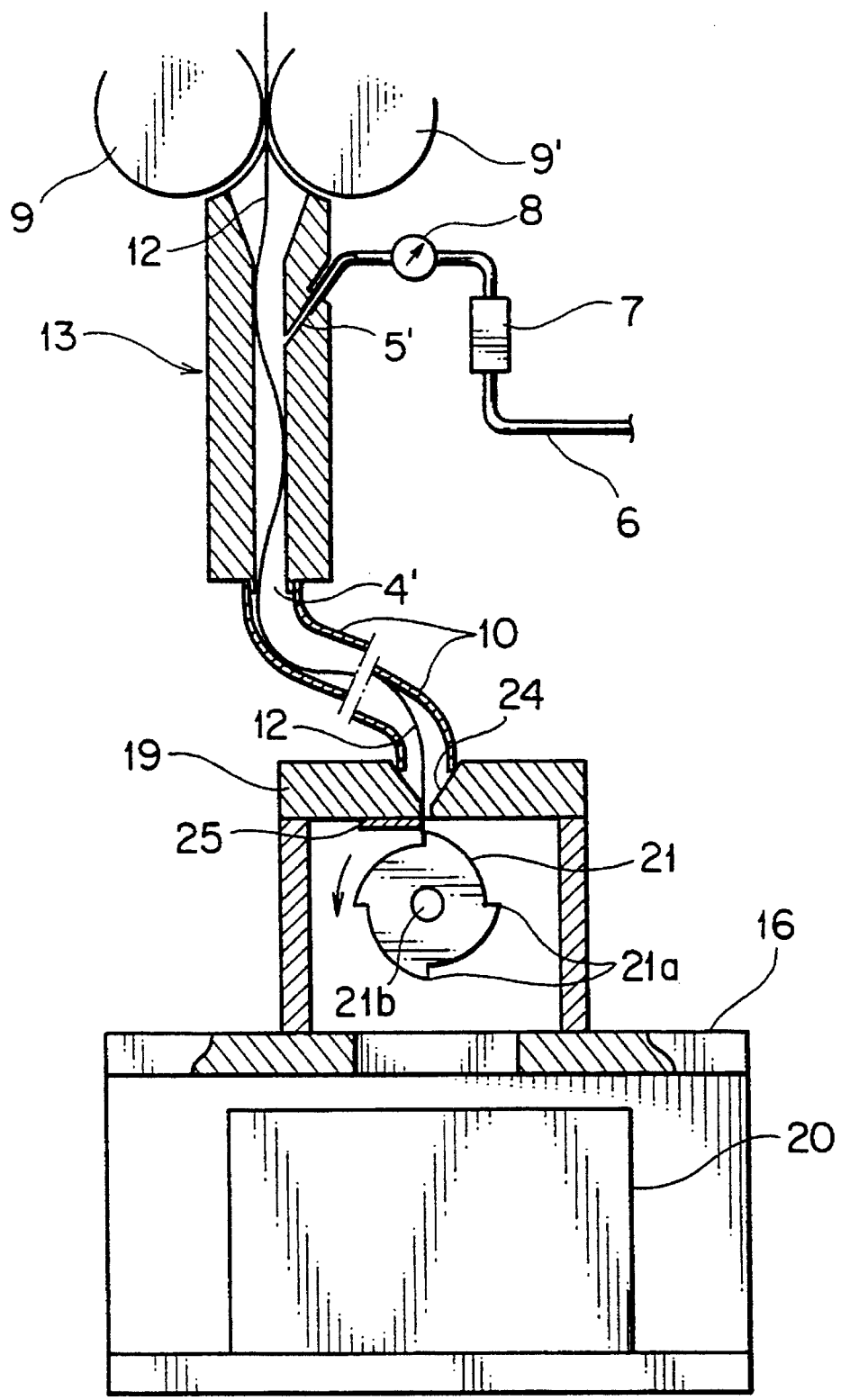
FIG. 5 is a side view of the wire cutting apparatus of FIG. 4 combined with the wire guide apparatus.

FIG. 4 is a perspective view of a wire cutting apparatus B to be combined with the wire guiding apparatus for an electric spark forming machine.

The wire cutting apparatus B includes a small motor 17 rigidly mounted on a support stand 16, a rotary blade fixing mount 18, a stationary blade mounting plate 19, and a chip box 20 located immediately below the rotary blade fixing mount 18.

On the side surface 18a of the rotary blade fixing mount 18 is provided a bearing 22 that supports the rotating shaft 21b of the rotary blade 21 having a plurality of cutting edges 21a on its periphery. The rotating shaft 21b is connected to the small motor 17 through a coupling 23.

On the upper surface 18b of the rotary blade fixing mount 18 is removably mounted a stationary blade mounting plate 19 that has a funnel-shaped wire insertion opening 24.

The stationary blade mounting plate 19 has a stationary blade 25 of hard steel mounted to the underside thereof along the wire insertion opening 24.

At the wire insertion opening 24 of the wire cutting apparatus B is placed a flexible tube 10 of the above embodiment to guide and introduce the wire 12 fed out by the wire discharge rollers 9, 9' of the electric spark forming machine into the wire insertion opening 24 through the guide tube 13 and the flexible tube 10.

In more detail, the guide tube 13 is installed close to the nip of the wire discharge nip rollers 9, 9', and the compressed air delivered through the air supply pipe 6 and through the air filter 7 and the pressure reducing valve 8 is injected from the fluid injection path 5' into the guide tube 13 as indicated by the arrow.

The wire 12 is guided by the flow of compressed air and fed through the flexible tube 10 into the wire insertion opening 24 of the wire cutting apparatus B. The rotary blade 21 is rotated in the direction of arrow to cut the wire by the cutting edges 21a of the rotary blade 21 and the stationary blade 25 into small chips that fall onto the chip box 20. The small chips are forcibly discharged into the chip box 20 by the compressed air flowing into the wire insertion opening 24 and therefore do not get stuck to the rotary blade 21.

The length of the cut wire chips is determined by the rate of supply of the wire 12 and the circumferential speed of the cutting edge 21a of the rotary blade 21. As the chip length becomes large, a large accommodating space is required. On the other hand, if the chip length reduced, the process speed is slowed down, lowering the productivity. It is therefore preferred to set the chip length at around 2 to 5 mm.

In the above embodiments, explanation is given as to the case where the above-mentioned guide apparatus is used in combination with the cutting apparatus that uses the rotary blade. It is noted, however, that the structure of the cutting apparatus is not limited. For example, the guide apparatus of this invention may be used in combination with a cutting apparatus that uses a reciprocating cutting blade.

Figure 6:
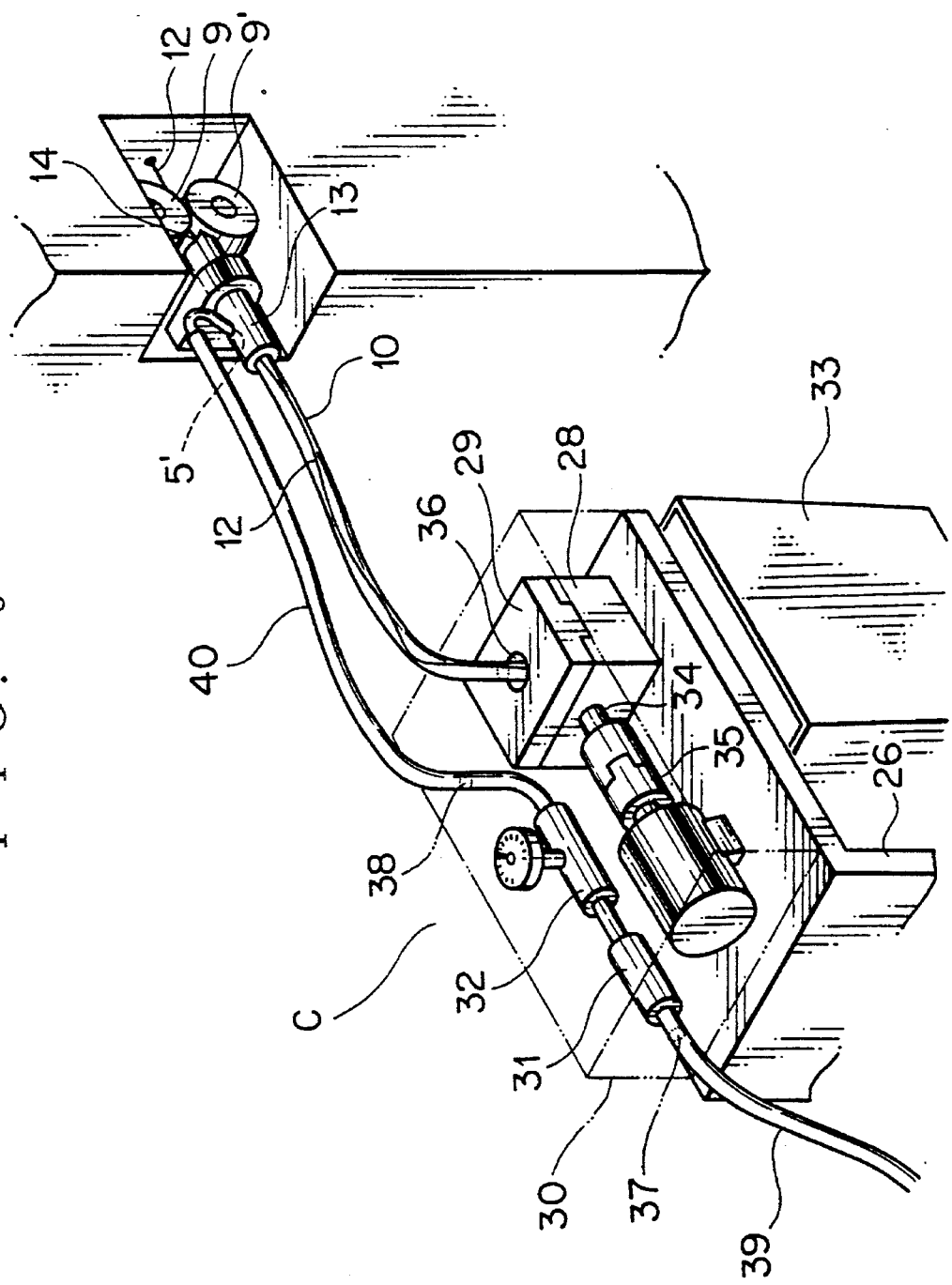
FIG. 6 is a perspective view of the wire cutting apparatus associated with another embodiment of this invention.
Figure 7:
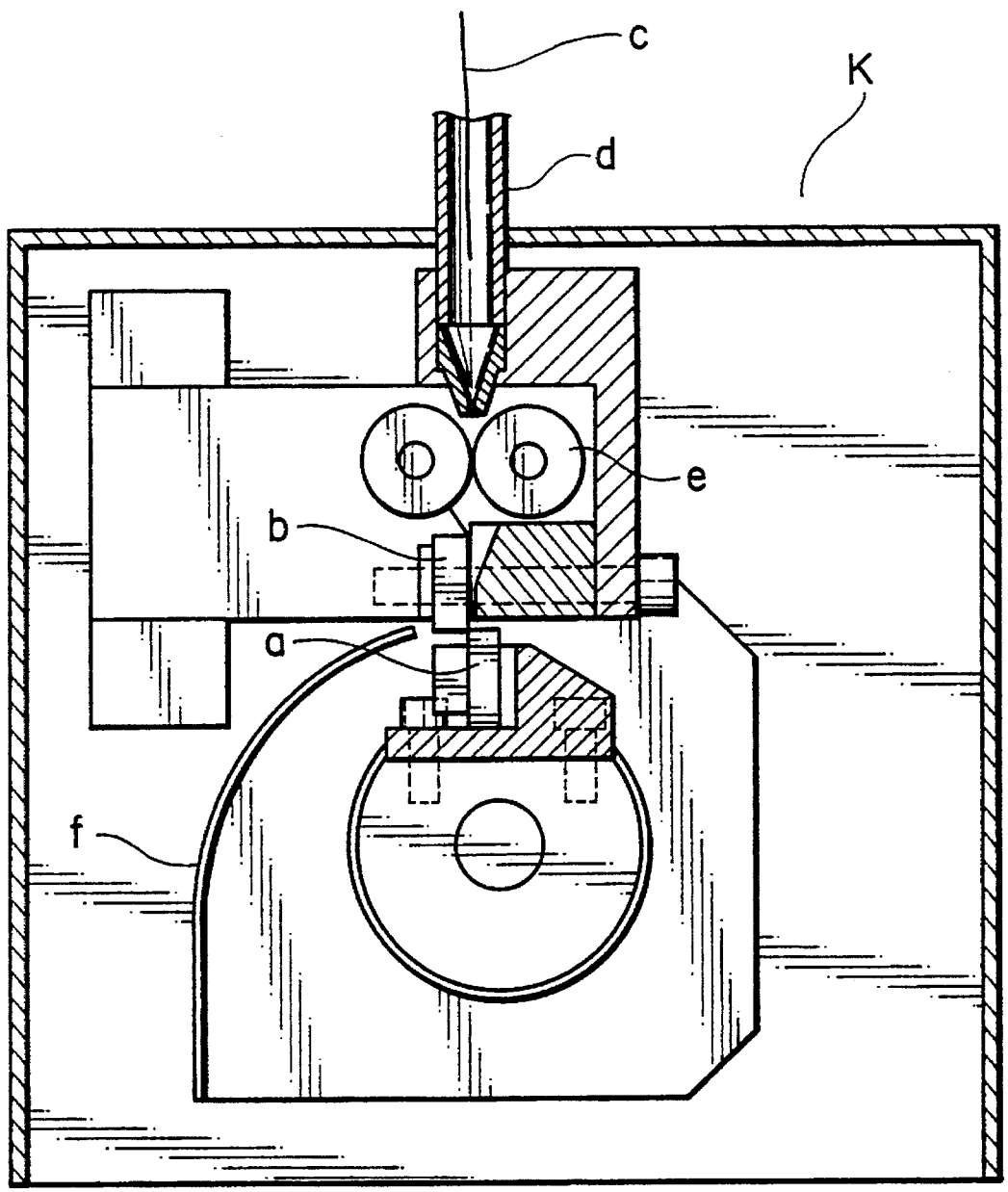
FIG. 7 is a side view of a conventional wire cutting apparatus for an electric spark forming machine.

FIG. 6 is a perspective view of a wire cutting apparatus C equipped with a wire guide apparatus for an electric spark forming machine as a further embodiment of this invention.

The wire cutting apparatus C includes a small motor 27 on the support stand 26, a rotary blade fixing mount 28, a stationary blade mounting plate 29, and a case 30 of plastics enclosing these. Immediately below the rotary blade fixing mount 28 is located a chip box 33. In addition to the small motor 27, rotary blade fixing mount 28 and stationary blade mounting plate 29, the case 30 also accommodates an air filter 31 and a pressure reducing valve 32 as a compressed air supply section.

In the rotary blade fixing mount 28, a rotary blade like the one used in the previous embodiment is mounted, though not shown, to the rotating shaft 34 and is driven by the small motor 27 via the coupling 35 to cut the wire.

The stationary blade fixing plate 29 is formed with a funnel-shaped wire insertion opening 36, and the end of the flexible tube 10 connected to the guide tube 13 as in the preceding embodiment is inserted into the case 30 and into the wire insertion opening 36.

The case 30 are provided with a compressed air introducing port 37 and a compressed air delivery port 38. An air supply pipe 39 is passed through the compressed air introducing port 37 and connected to the air filter 31, which in turn is connected to the pressure reducing valve 32 and through the compressed air delivery port 38 to a flexible air delivery tube 40 of rubber or nylon, which runs parallel to the flexible tube 10 and is connected to the fluid injection path 5' of the guide tube 13.

The wire introducing port 14 of the guide tube 13 is located close to the nip of the wire discharge rollers 9, 9' to guide the wire 12 fed out by the nip rollers 9, 9' through the guide tube 13 and flexible tube 10 into the wire insertion opening 36 for cutting.

Because the wire cutting apparatus C has the cutting mechanism and the compressed air supply section accommodated in the case 30, it is easily moved to a desired location and operated simply by connecting to an external pressurized air source. At the same time, since the guide tube 13 is connected to the flexible tube 10 and the flexible air delivery tube 40, the wire cutting apparatus C has the advantage of being able to be installed easily at an appropriate position near the nip of the wire discharge rollers 9, 9'. It can also be connected to and disconnected from the guide tube 13.

Because the wire guide apparatus for electric spark forming machine according to this invention uses a guide tube that utilizes the flow of compressed gas, the used wire discharged from the electric spark forming machine can reliably be drawn into the guide tube and fed smoothly to the wire discharge port. The flow of the compressed gas prevents the wire from getting stuck in the inner wall of the guide tube.

Therefore, by connecting the flexible tube to the wire discharge port, it is possible to guide the wire from the wire discharging section of the electric spark forming machine to the wire accommodating section at a remote location, making it unnecessary to directly mount to the electric spark forming machine the cutting apparatus that generates vibrations. This in turn prevents unwanted vibrations from being transmitted to the electric spark forming machine that is required of high machining precision.

The fact that the used wire can be guided to an appropriate location for processing contributes to effective utilization of space.

By pointing the circumferential wall of the wire introducing port of the guide tube, it is possible to bring the opening end of the wire introducing port very close to the nip of the rollers of the wire discharge section of the electric spark forming machine, ensuring an efficient suction of wire and improving reliability.

The use of the transparent flexible tube allows quick and reliable check of the wire being guided, ensuring a smooth wire processing work and an improved productivity.

What is claimed is:

1. A wire guide apparatus for disposition at a wire discharge section of an electric spark forming machine comprising:

a guide tube having a wire introducing port disposed at said wire discharge section of said electric spark forming machine for drawing in a wire discharged from said electric spark forming machine;

a compressed gas supply section;

the guide tube including:

a funnel-shaped wire introducing port formed at one end thereof;

a wire discharge port formed at the other end thereof; and a fluid injection path passing through a circumferential wall of the guide tube and opening inside the guide tube toward the wire discharge port;

a wire cutting apparatus having a wire inlet disposed remotely from said wire discharge port of said guide tube;

means for injecting compressed gas into the guide tube from the compressed gas supply section through the fluid injection path to guide the wire from the wire introducing port through the wire discharge port; and an elongated tube having its inlet end connected to said wire discharge port and its other end communicating with said inlet to said wire cutting apparatus, whereby said compressed gas operates to create a suction for drawing wire from the discharge section of said electric spark forming machine into said guide tube and for discharging it under pressure into the inlet of said wire cutting apparatus.

2. A wire guide apparatus for an electric spark forming machine according to claim 1, in which said wire discharge section of said electric spark forming machine includes cooperating wire discharge rollers having a nip therebetween and wherein the circumferential wall of the guide tube is shaped to conform with the shape of the nip of the wire discharge rollers so that the wire introducing port is pointed for close spacing in the nip of said wire discharge rollers.

3. A wire guide apparatus for an electric spark forming machine according to claim 1, wherein the elongated tube is a flexible tube.

4. A wire guide apparatus for an electric spark forming machine according to claim 3, wherein the elongated tube is transparent.

5. A wire guide apparatus for an electric spark forming machine according to claim 1, wherein the compressed gas is composed of air.

6. A wire guide apparatus for an electric spark forming machine according to claim 5, wherein the compressed gas is delivered at pressures from about 1.0 to about 2.0 kg/cm$^2$.

7. A wire guide apparatus for an electric spark forming machine according to claim 1, the chip length produced by the wire cutting apparatus is between about 2 and about 5 mm.

* * * * *